United States Patent [19]

Ringlien

[11] 4,019,795
[45] Apr. 26, 1977

[54] PASSIVE ALIGNMENT OF LASER MIRRORS

[75] Inventor: James A. Ringlien, Maumee, Ohio

[73] Assignee: Owens-Illinois, Inc., Toledo, Ohio

[22] Filed: June 11, 1975

[21] Appl. No.: 586,008

[52] U.S. Cl. .................................................. 316/1
[51] Int. Cl.² .......................................... H01J 9/00
[58] Field of Search .............. 316/1, 17, 18, 19, 20, 316/21, 24; 331/94.5 D

[56] References Cited

UNITED STATES PATENTS 3,740,110   6/1973   Horton et al. ....................... 316/21

OTHER PUBLICATIONS

"Prealignment of Gas Laser Cavities" by K. G. Hernqvist et al., Rev. Sci. Instrum. vol. 46, No. 8, Aug. 1975.

*Primary Examiner*—Richard B. Lazarus
*Attorney, Agent, or Firm*—Donald Keith Wedding

[57] ABSTRACT

There is disclosed a passive mirror alignment system to permit alignment of the output coupler of a gas laser device relative to the flat mirror so as to produce the necessary optical resonator without the need to evacuate, backfill with gas, and maintain a plasma within the device.

6 Claims, 6 Drawing Figures

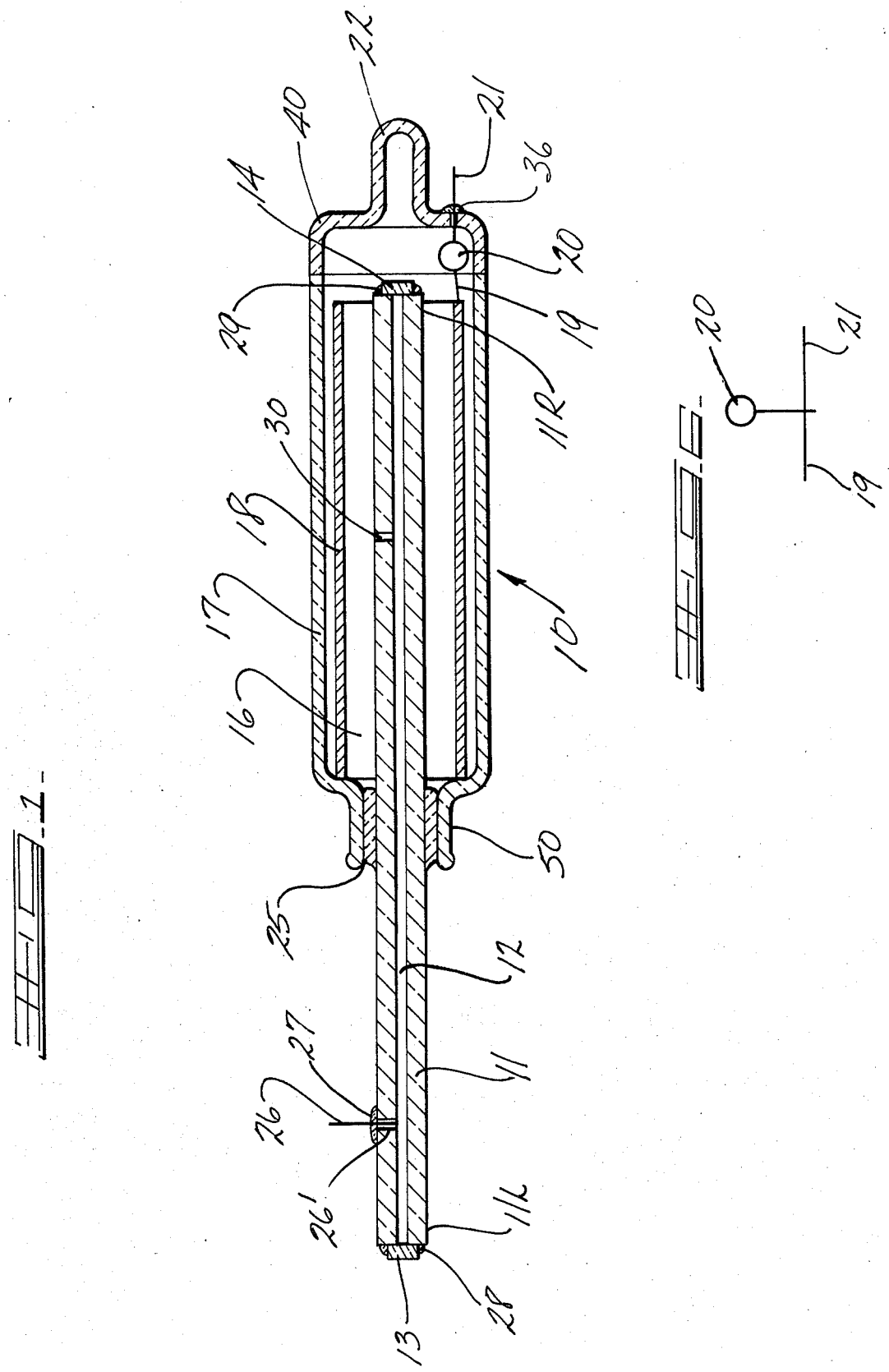

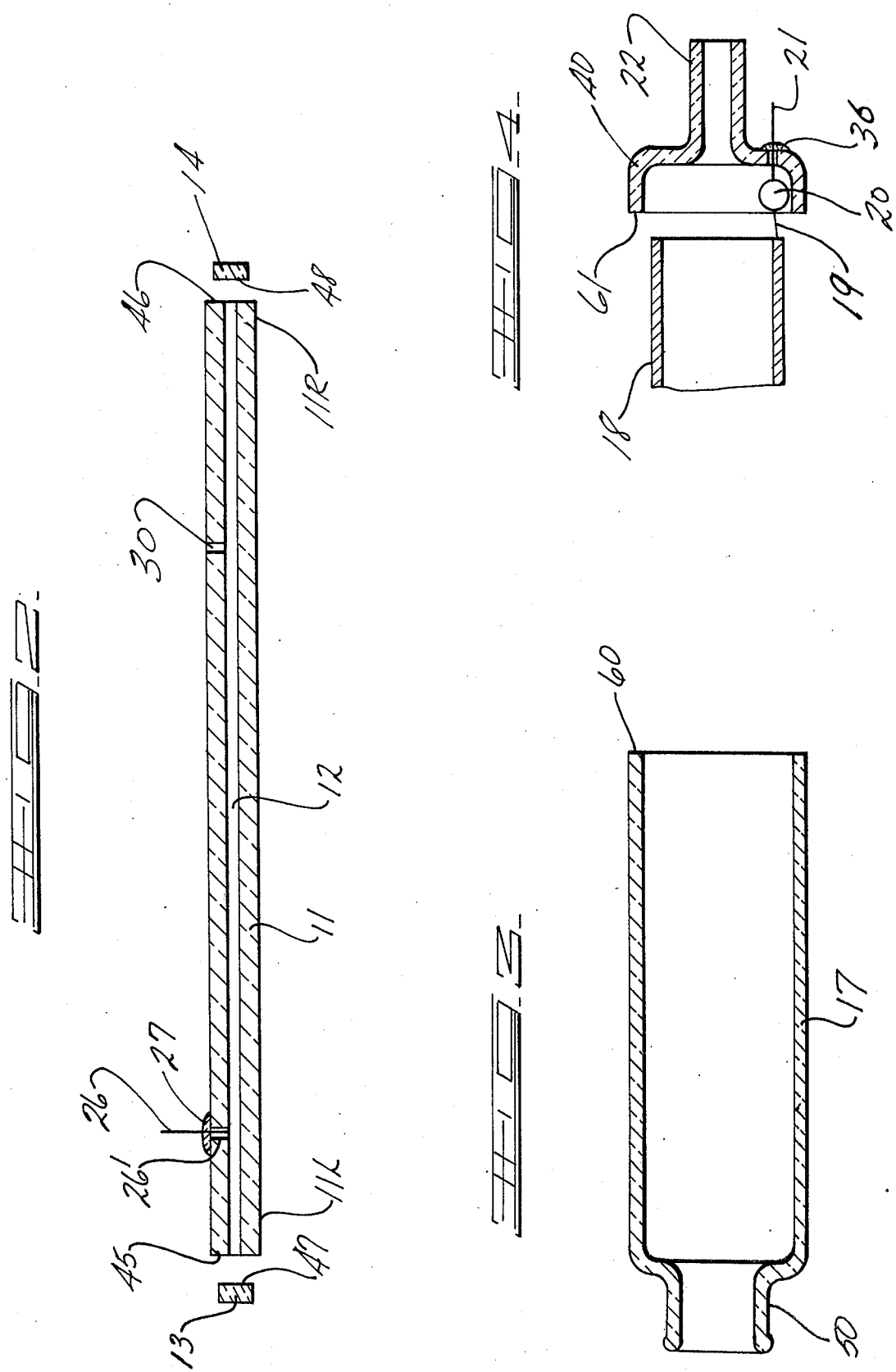

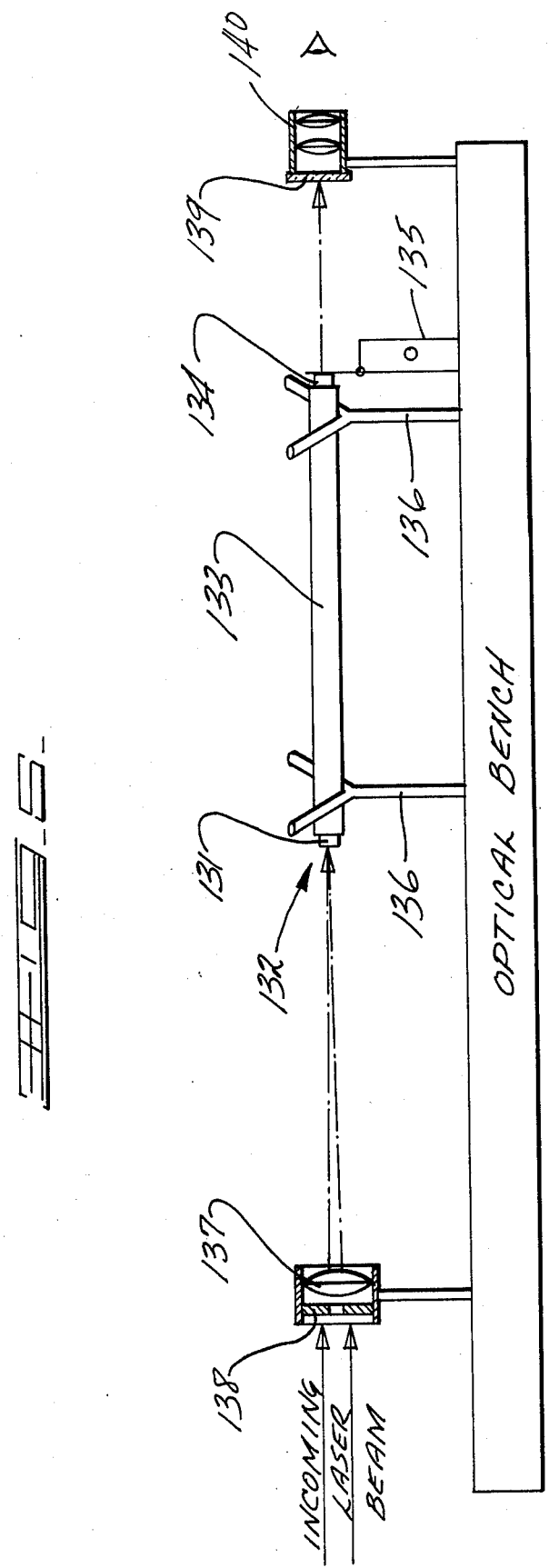

PASSIVE ALIGNMENT OF LASER MIRRORS

This invention relates to passive mirror alignment gaseous lasers, particularly lasers of a compact tubular construction. In one embodiment of this invention, a tubular laser is fabricated from three subassemblies, each subassembly being separately tested to assure high quality. These subassemblies are constituted by (a) an exhaust stem with cathode leads and getter, (b) a cathode envelope and cathode and (c) a laser capillary with anode and laser end pieces, such as mirrors, Brewster windows, etc. The advantages of these basic sub-assemblies are that solder glass seals can be made at relatively low temperatures and at device locations and heating cycle times such that no contaminatory effects are introduced into the component parts nor are there any fabrication complexities introduced by the sub-assembly approach disclosed herein. Fabrication simplicity and certainty is achieved. Moreover, an economic saving is achieved by permitting the individual components to be tested for quality of construction prior to final assembly into an operating laser.

Since the laser capillary is manufactured as a separate component and the anode attached thereto, along with laser mirrors and/or other laser end pieces, the grinding of mirror seats and the mounting of mirrors are relatively easy and can be completely tested before committing this laser tube sub-assembly attachment to the cathode envelope. Moreover, the cathode envelope is such as to encompass the fully reflecting end of the laser cavity so that only one mirror seal is outside the device which therefore assures less chance of leakage and insures better prospects for the success of the solder glass seal. The stem or exhaust tube and the glass to metal seals for the cathode lead-in, which constitutes the most difficult and tedious glass work, can be done on conventional equipment. The cathode envelope is provided with an elongated axial bore portion of reduced diameter between which and the capillary a solder glass sealant is provided, for joining and forming a seal between the capillary and the cathode envelope, with minimum opportunity for bending of the capillary. The final seal between the cathode envelope and exhaust stem is a simple fusion operation wherein a sealing flame is applied to the junction of the two subassemblies. Since the solder glass seals are made before the cathode material is inserted in the tube, the cathode material is not exposed to these sealing temperatures. Furthermore, to avoid high-temperature exposure of the cathode, the final hermetic seal is made at a location remote from the cathode material. The device is then gas filled and the exhaust steam sealed off.

The capillary is relatively short and is supported near its center so that there is a long portion of the capillary extending beyond the cathode envelope to permit magnetic polarization of the laser, by placement of magnets near the small diameter exposed section of the capillary. Typically a minimum of about 2 inches of the exposed capillary length within the magnetic field will provide a high extinction ratio.

The extinction ratio is the ratio of maximum light intensity to minimum light intensity passed through a polarization analyzer. This ratio can be represented by the following equation:

$$R = I \text{ Max.}/I \text{ Min.}$$

The extinction ratio is related to the degree of polarization D by the following equation:

$$D = R-1/R+1$$

The above and other advantages and features of the invention will become more apparent from the following specification when considered in light of the drawings which represent one of the best embodiments contemplated by the inventor in the practice of his invention.

DESCRIPTION OF THE DRAWINGS

FIG. 1 is a cross-sectional view of a gas laser structure of the type incorporating the invention;

FIG. 2 is a cross-sectional view of the laser capillary with anode and mirrors positioned for joining thereto, it being appreciated that this disclosure of FIG. 2 is as a sub-assembly or component which may be completely tested in a cathode envelope environment for proper alignment of the mirrors;

FIG. 3 is a cross-sectional view of a major portion of the cathode envelope, and FIG. 4 is a cross-sectional view of the exhaust stem with a cathode portion and the getter.

FIG. 5 is a schematic diagram of a passive alignment system representing a suitable mechanism for aligning the mirrors of lasers made in accordance with this invention.

FIG. 6 is a schematic of the getter.

Referring to FIG. 1, the laser 10 is constituted by a laser tube assembly having a laser tube 11 which is a capillary tube having a bore 12 and relatively thick walls for mechanical stability purposes and maintaining at least the mirror ends 11L and 11 R in optical alignment during normal use of the laser. In addition, in a manner to be described hereinafter, a solder glass seal 25 is formed between the outer exterior walls of capillary tube 11 and annulus 50 which is integral with the cathode envelope 17. Thus the laser capillary tube 11 is relatively short and advantageously supported near its center in a balanced assembly. Each end of the laser bore 12 is terminated by laser end pieces, shown as laser mirrors 13 and 14, respectively at the left end 11 L and right end 11 R of laser tube 11. These mirrors are joined in assembly to the laser tube by solder glass sealants 28 and 29. An anode electrode 26 passes through a sealant 27 to a small transverse bore 26' to provide a pin anode for the laser.

The cathode envelope is formed in two parts, a major portion labelled with the numeral 17 and a second portion labelled 40 which jointly form a cathode chamber 16 in which is located the cathode 18. In the embodiment shown, cathode 18 is an aluminum cylinder, connected by a lead 19 and getter 20 to a cathode lead-in 21, which is sealed in an exhaust stem assembly by a glass-metal seal 36.

The laser capillary tube sub-assembly is provided with a transverse bore 30 which is positioned at approximately the center point of the cathode. An exhaust stem 22 is integrally formed with portion 40 of the cathode envelope and carries cathode lead in 21, getter 20 and cathode connection 19 along with the cathode 18, all of which may be carefully examined and tested as a sub-assembly.

In a further exhaust stem arrangement not illustrated in the drawings, the exhaust stem has a diameter less than the diameter of the cylindrical portion of the first sub-assembly so that the exhaust stem can be telescoped internally of the first sub-assembly and fused thereto after the joining of the second sub-assembly to the laser capillary tube by the solder glass sealant.

In a further embodiment of this exhaust stem arrangement, a plurality of metal pins extend through the header portion for structural support of the cathode and gas getter and for electrical connection to the cathode. Also electrical connectors to the getter may be necessary if the getter is not activated externally by RF (radio frequency) or electrical induction.

FIGS. 2, 3 and 4 show in detail the three sub-assemblies which are to be joined when each has been tested and shown to be satisfactory. Thus, FIG. 2 discloses the cathode tube 11 with the mirrors 13 and 14 in a position to be joined to end surfaces 45 and 46 at the left end 11 L of tube 11 and the right end 11 R of laser tube 11. The ends 45 and 46 form mirror seats which may be ground prior to assembly, thereby making the mirror mounting relatively easy and further permitting this assembly to be completely tested in a test jig for operation. In other words, merely by enclosing the entire assembly shown in FIG. 2 in a test laser cathode envelope and applying operating potentials thereto, the device shown in FIG. 2 may be completely assembled, tested, and stored for subsequent assembly with other tested components. This sub-assembly of FIG. 2 can easily be assembled with cathode envelopes other than those shown herein.

The solder glass sealant 28 and 29 for the mirrors 13 and 14, respectively, may be made at the relatively low temperatures required therefor without exposure of any cathode material to such sealing temperatures. In like manner, the major portion of the cathode envelope 17, as shown in FIG. 3, has an end annulus 50 which has a diameter greater than the diameter of the capillary so as to form a cylindrical space between the capillary tube 11 and annulus 50. The low temperature solder glass sealant fills the cylindrical space and forms a unitary support and seal for the laser capillary tube 11, it being noted that the ends 11 L and 11 R are unsupported in the assembly as shown. Laser mirror 14 is a fully reflective mirror so the optical properties of the exhaust stem assembly are not important for laser operation. However, it will be appreciated that the exhaust stem 22 may be offset from the axial alignment shown with the bore 12 and the end mirror 14 and an optical coupling permitted thereby if desired. As indicated earlier, the laser capillary sub-assembly can be incorporated in other forms of cathode envelopes.

In FIG. 4, a portion of the aluminum cathode cylinder 18 is shown connected to its lead conductor 19 and getter 20 which are supported on a cathode lead-in 21. Optionally these may be separated supported. In FIG. 6 there is shown a schematic of how the getter may be actually connected inside the laser device. The cathode lead-in passes through a solder glass sealant 36 and this assembly, as in the case of the sub-assemblies shown in FIGS. 2 and 3, may be completely examined and tested for prior to assembly. The solder glass seal 36 may be omitted and the cathode envelope portion 40 fused or heat sealed directly to the cathode lead-in 21. It will be noted that the exhaust stem 22 is shown as open in this case. Moreover, the ends 60 on the cathode envelope and 61 on the exhaust stem sub-assembly have been adapted for flame sealing (or solder glass sealing) and it will be noted that this is done after the cathode envelope 17 and the solder glass seal therefor with respect to tube 11 has been completed. In other words, the cathode 18 is simply slipped or telescoped inside the envelope 17 after it has been joined to the tube 11. The cathode cylinder 18 may easily be replaced by a thin film cathode which is evaporated upon the interior walls of envelope 17 with electrical contact thereto being made by a spring contact lead-in.

The free end of the laser capillary 11 to the left of solder glass seal 25 permits a strong transverse magnetic field to be applied for magnetic polarization.

Formation of the cathode envelope in two sub-assemblies and fusing one sub-assembly to the other after joining or making the solder glass seal 25, avoids contamination and destruction and shortening of the life of the cathode 18. The fill tube 22 can be attached to conventional gas processing equipment and flame tipped or pinched off after this operation has been carried out.

The solder glass seals permit much higher temperature bake out in gas processing than do conventional organic (epoxy) seals — which contribute to processing time/lost as well as loss of operating life and shelf life. Shelf life is a particularly important consideration which is significantly improved through solder glass seals.

The laser device is filled with any of a wide variety of lasable gases such as helium, neon, argon, krypton, xenon, hydrogen, oxygen, nitrogen, mercury, carbon dioxide, carbon monoxide and so forth. Mixtures of gases may also be utilized such as helium and neon; carbon dioxide and helium, carbon dioxide and nitrogen; carbon dioxide, nitrogen, and helium; helium and neon; and carbon dioxide, nitrogen, helium and xenon. One preferred gas mixture is helium-neon, the typical composition being about 80 to 95% atoms of helium and 5 to 20% atoms of neon. One very specific composition is 87.5% atoms of helium and 12.5% atoms of neon.

The laser device is typically filled with a helium-neon gas mixture with the ratio of helium (in percent atoms) to neon (in percent atoms) ranging from about 2:1 to about 30:1, typically about 5:1 to about 10:1.

Although a wide variety of glass tubing material is contemplated for the practice of this invention, soda lime tubing has typically been used for the laser capillary and envelope. This has expansion of $93 \times 10^{-7}$ per °C and a contraction of $113 \times 10^{-7}$ per °C. It is desirable that the mirror material expansion and contraction coefficients be sufficiently close so as to match the coefficients of the tubing. However, any difference in coefficients may be compensated by the solder glass used to seal the device. Typically there have been used Metrologic mirrors made from float glass having an expansion of about $90 \times 10^{-7}$ per °C. Other glass tubing materials include borosilicates, soda lime, lime borosilicates, Crown glasses, and lead borosilicates.

Other glasses may also be used for the mirrors so long as the transformation or strain point temperature are above the firing temperature of the solder glass. This is important since the mirror coatings can be degraded at high firing temperatures.

Any glass used for mirrors must also be considered on the basis of its polishing characteristics and acceptance of coatings since these factors influence the economics of manufacture of laser quality mirrors. Typical mirror glasses which may be used include borosilicates, soda lime, lime borosilicates, Crown glasses, and lead borosilicates.

In any case, the materials system is not limited to a particular glass except for matters for expediency. The important criteria are that the mirror has appropriate expansion and contraction coefficients with respect to the capillary, has a strain point temperature above the solder glass temperature, and has reflective coatings appropriate for the operation of the gas laser, e.g. an output of 6328 angstrom units for a HeNe gas laser. In one particular embodiment the inboard mirror is flat and the output mirror has a 30 Centimeter radius facing the flat mirror. Other radii arrangements may also be utilized.

Solder glasses, also referred to as low temperature sealing glasses, are used in order to seal and fire the device at low temperatures, e.g. at about 425° F or below, and mitigate the possibility of degrading the various glass components used in constructing the device, particularly the mirror and the mirror coating.

The important characteristics of the solder glass are: it is the crystallizing type so that repeated heat cycles will not permit previous seals to relax; seal temperatures are below the strain point so that the capillary will not bend; and the solder glass sealing temperature is below the strain point of the mirrors so that the coating properties are not compromised in repeated seal cycles.

The usual vehicle of amylacetate and nitrocellulose is typically employed to permit spatula or extrusion application to the laser joints. Firing does require vertical element positioning so that favorable direction of solder glass flow is achieved to effect a seal.

The solder glass mirror sealing is different from the usual practice in that the solder glass is not placed between the mirror and the capillary. It is applied as a fillet or bead after the mirror has been precisely positioned with respect to the capillary bore. Considerable care must be exercised in preparation and application to achieve a vacuum-tight mirror seal.

Example of solder glasses include those disclosed in U.S. Pat. Nos. 3,127,278 and Re 25,791, both of which are incorporated herein by reference.

A typical solder glass which may be used comprises about 65 to 80 percent by weight PbO, about 5 to 21 percent by weight $B_2O_3$, about 0.5 to 15 percent by weight ZnO, about 0.5 to 10 percent by weight CuO, about 0 to 6 percent by weight $SiO_2$, about 0 to 5 percent by weight AgO, about 0 to 10 percent by weight CdO, and about 0 to 5 percent by weight $Al_2O_3$. The mirror end pieces are mounted using a so-called passive alignment system. As one example of a mirror mounting and alignment system suitable for use with the lasers described herein, reference is made to the "Passive Alignment System" illustrated in FIG. 5. It will be clear to those skilled in the art that, although FIG. 5 illustrates a capillary-tube laser, the mounting and alignment method and device described are adaptable to many other forms of lasers, such as the pressed-glass lasers described in copending U.S. patent application Ser. No. 523,609, filed Nov. 11, 1974 by Dr. M. E. Fein et al and assigned to the assignee of the present application. Such adaptation requires obvious straightforward changes in the fixturing vees.

Prior to placing the laser envelope on the passive alignment station shown in FIG. 5, a first mirror 131 (typically a near-100%-reflective flat mirror) is mounted on the back end 132 of laser bore 133. Mirror 131 is aligned and mounted nearly perpendicular to the axis of laser bore 133 by methods well known in the art, such as viewing mirror 131 with an autocollimator aligned to the axis of bore 133.

The purpose of the passive alignment system is to permit alignment of the second mirror 134 (typically a spherical output coupler) relative to the first mirror 131 so as to produce the necessary optical resonator without the need to evacuate, backfill with gas and maintain a plasma within the device. The resonator is formed with atmospheric-pressure air in the bore of the device. This is particularly desirable when solder glass is used to attach the mirrors. If the tube were evacuated when the solder glass-vehicle mixture was applied, severe gas and mirror contamination by the solder glass and vehicle could result.

The laser tube 133, with the first mirror attached to the back end 132 and perpendicular to the bore 133, is set up in two adjustable metal support vees 136 on an optical bench. One vee is near each end. The first mirror is positioned at the focal point of a lens 137 whose focal length is comparable to the length of bore 133, and may typically be 30 centimeters (cm) in length. A beam from a frequency modulated laser, typically a Spectra-Physics model 125 laser with $\Delta f \cong \pm 40$ MHz, is passed through an aperture 138 (typically 1.5 mm) and illuminates the center of lens 137. The resulting focal spot falls on the first mirror of the laser device being worked on. A thin white diffuser (not shown) is placed over this mirror between the mirror and the lens and the operator looks down the bore of tube 133 toward the illuminating laser, while adjusting the lateral and vertical position of the mirror end 132 of the tube. When the operator sees the small bright spot on the diffuser centered in the end of the tube, he knows the beam is entering the center of the mirror end 132 of the tube. The diffuser is then removed.

A ground glass 139 with magnifier 140 is placed about 8 inches from the open end of tube 133 and the operator looks into this while adjusting the vertical and lateral position of the open end of the tube. When he sees a pattern of maximum symmetry, he knows that the fraction of the illuminating beam that leaks through the first mirror is now going down the center of the bore.

The second mirror 134 is then placed on the open end of tube 133 and is held in place and also moved vertically and laterally over the flat tube end by micromanipulator 135. As the mirror is moved about, a position can be found where the tube-mirror combination transmits light quite strongly. This is the desired Fabry-Perot resonance condition necessary for laser operation. After peaking up this resonance, solder glass or epoxy is applied. This material is allowed to dry or harden while micromanipulator 135 holds mirror 134 in place.

Use of a frequency-modulated illuminating laser greatly facilitates passive alignment. Without frequency modulation, one has to wait for coincidence of a longitudinal mode of the illuminating laser with a longitudinal mode of the resonator under construction. The resultant flashing makes it very difficult to know if an increase in brightness is due to some adjustment made or to a mode coincidence. The illuminating laser is frequency-modulated with a peak-to-peak frequency sweep approximately equal to its longitudinal mode spacing. It is modulated at a frequency high enough so that to the eye the momentary mode coincidence look continuous.

A laser comprises basically a resonant optical cavity containing an amplifying medium which, in the gas laser, is two mirrors placed at opposite ends of a column of excited gas.

The choice of cavity design, mirror design, materials and gases are well known to those skilled in the art. Similarly well known are the choices and designs possible for cavity end pieces used to seat the mirrors, to introduce electrodes and, when required, to introduce Brewster windows within the cavity. An important step in assembling the laser is to align the mirrors to the axis of the excited gas column and to each other in order to form the resonant optical cavity. Mirror alignment consists of the following steps:

1. Locating the axis of the excited gas column.
2. Aligning the axis of reflection of the first mirror to the axis of the gas column.
3. Aligning the axis of reflection of the second mirror to both the axis of reflection of the first mirror and the axis of the excited gas column.
4. Fixing the mirrors permanently in place.

The permissible tolerances of piece parts and preparatory processes are also well known. Some variation from the optimum is permissible in mirror alignment, especially in the case of the near-hemispherical resonator where the optical mode is approximately conical. Aligning the mirrors is less critical since the apex of the cone can move across the flat mirror to compensate for angular errors. For example, with a cavity length of 250 mm and cavity diameter of 1 mm the flat mirror can be deflected by almost ±3 minutes and the curved mirror by almost ±0.05 mm laterally before significant power output is lost.

Lasers made according to this invention may be energized by any convenient means, typically with a direct current applied to the cathode and anode in excess of 1500 volts. The voltage may have to be in excess of 3000 volts in order to start the laser. An operating voltage of 2000 is typical. Ballast resistors in excess of 100,000 ohms are generally used between power source and the anode. The cathode is generally grounded.

I claim:

1. In a manufacturing process for the assembly of a gaseous laser device, said device comprising a laser capillary tube filled with a laseable gas, at least two reflective end pieces being associated with the capillary tube, at least one of the end pieces comprising an output coupler and at least one of the end pieces having a maximum reflectance at the wave length of the laser output, the process improvement which comprises optically aligning at least one output coupler with respect to at least one maximum reflectance end-piece before the capillary tube is filled with a laseable gas, said process improvement comprising the steps of:

a. positioning an output coupler at one end of the capillary tube and positioning a maximum reflectance end piece at the opposite end of the capillary tube;
b. passing a laser beam coaxially through the capillary, said laser beam being introduced into the capillary from an external laser beam source through a reflective end piece positioned at one end of the capillary;
c. and adjusting the end piece positioned at the opposite end of the capillary with respect to the laser beam passing through the capillary such that an optimum optical resonance condition is achieved between the two reflective end pieces positioned at the respective ends of said laser capillary tube.

2. The invention of claim 1 wherein the laser beam introduced into the capillary is frequency modulated.

3. The invention of claim 1 wherein the laser beam introduced into the capillary is from an external helium-neon source and the reflectivity of the end pieces is peaked at a wavelength of 6328 angstrom units.

4. The invention of claim 1 wherein the laser beam is coaxially introduced through the maximum reflective end piece into the capillary.

5. The invention of claim 1 wherein the end pieces are permanently attached to the capillary tube after the end pieces are adjusted to an optimum optical resonance.

6. The invention of claim 1 wherein the optimum optical resonance is detected by the symmetry and brightness of the light beam transmitted from the capillary.

* * * * *